June 11, 1946.　　　L. A. HAWKINS　　　2,401,931
SEED POTATO CUTTING MACHINE
Filed Oct. 1, 1943　　　2 Sheets-Sheet 1
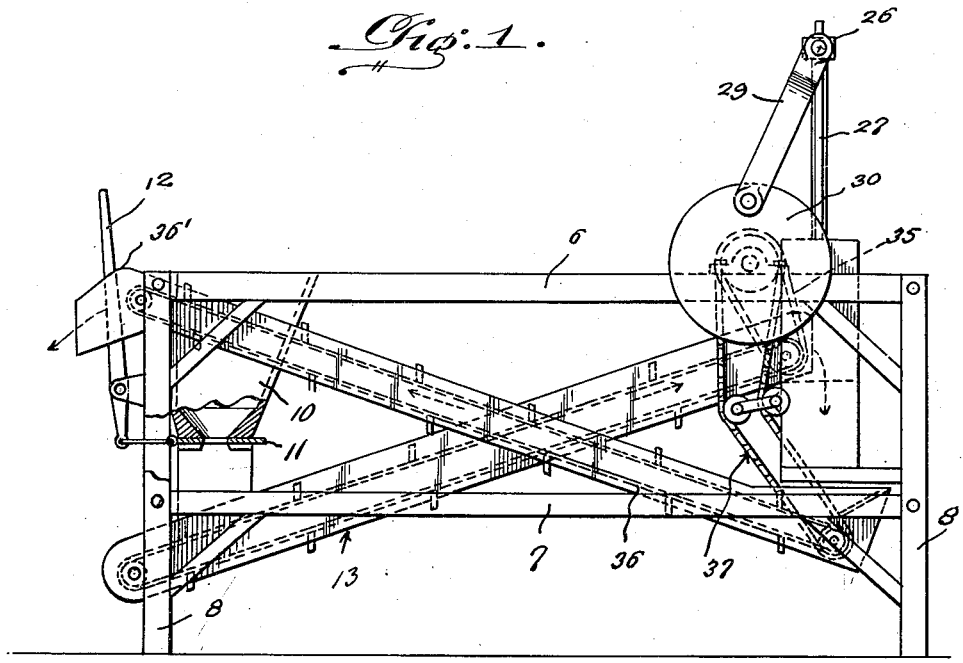
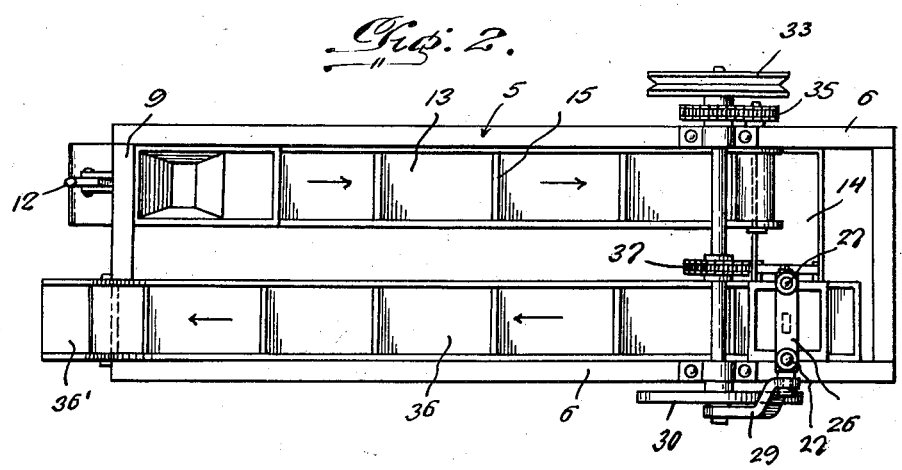
Inventor
Lester A. Hawkins,
By McMorrow and Berman
Attorneys June 11, 1946.  L. A. HAWKINS  2,401,931
SEED POTATO CUTTING MACHINE
Filed Oct. 1, 1943  2 Sheets-Sheet 2

Inventor
Lester A. Hawkins,

Attorneys

Patented June 11, 1946

2,401,931

UNITED STATES PATENT OFFICE 2,401,931

SEED POTATO CUTTING MACHINE

Lester A. Hawkins, Creve Coeur, Ill.

Application October 1, 1943, Serial No. 504,599

1 Claim. (Cl. 146—169)

This invention relates to a power operated seed potato cutting machine, and has for the primary object the provision of a machine of the above stated character which will cut a maximum number of seed potatoes into proper or desired number of parts for planting within a minimum length of time and requires only the effort of a single person in the feeding of the potatoes into the machine and the sacking of the cut potatoes as they leave said machine.

Another object of the invention is to provide a machine of the class characterized which only requires the services of a single operator standing substantially adjacent one end of the machine to feed the potatoes and sack the cut potatoes.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation, partly in section, illustrating the seed potato cutting machine constructed in accordance with my invention.

Figure 2 is a top plan view illustrating the device.

Figure 3:
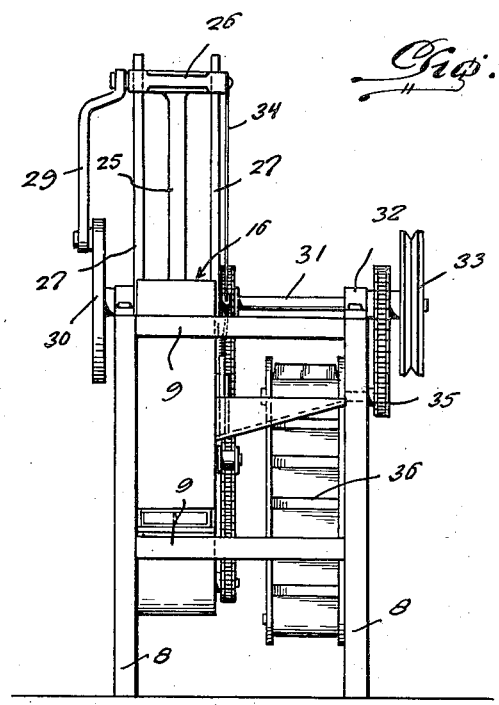
Figure 3 is an end elevation illustrating the device.
Figure 5:
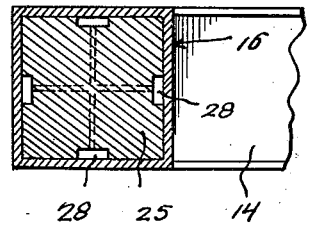
Figure 5 is a detail sectional view taken on the line 5—5 of Figure 4.
Figure 4:
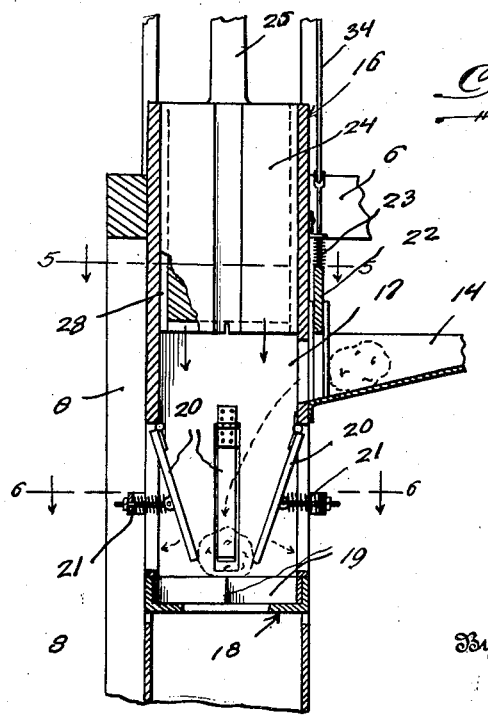
Figure 4 is a fragmentary transverse sectional view illustrating the cutting mechanism.
Figure 6:
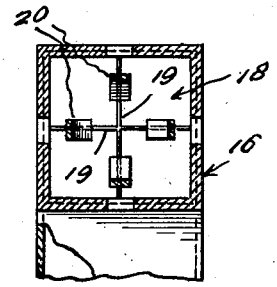
Figure 6 is a detail sectional view taken on the line 6—6 of Figure 4.

Referring in detail to the drawings, the numeral 5 indicates an elongated supporting body frame including upper and lower longitudinally extending members 6, 7, vertically arranged supporting legs 8 connected thereto and transversely extending members 9.

A potato supply hopper 10 is arranged at one end of the supporting structure and includes a slidable control gate 11 operated by a pivotally mounted hand lever 12 whereby potatoes from the hopper may be dropped one at a time upon an endless conveyor 13 supported in an inclined position on the supporting structure 5 and leads to an inclined transversely arranged chute 14. The endless conveyor 13 includes flights 15 and spring fingers to engage the potatoes and cause them to travel upwardly on the inclined run of the endless conveyor and drop said potatoes singly into the chute 14 for movement by gravitation into a potato receiver containing a cutting mechanism 16 located adjacent the opposite end of the supporting body frame from the hopper 10.

The potato receiver forms a vertically arranged chamber 17 to which the inclined chute 14 connects. A knife construction 18 is arranged in the lower end of the chamber and includes a plurality of crossed blades 19 for the purpose of severing the potato into a selected number of parts.

Arranged in the chamber 17 above the knife construction 18 is a plurality of centering strips 20 spring influenced, as shown at 21, for the purpose of centering a potato with respect to the knife blades as it gravitates from the chute 14. The movement of the potato into the chamber 17 from the chute 14 is controlled by a slidable gate 22 spring actuated in one direction by a spring 23.

Slidably mounted in the chamber 17 above the centering strips 20 and chute 14 is a plunger 24 including a stem 25 connected to a cross head 26 slidably mounted on vertical guides 27. The walls of the plunger 24 are grooved, as shown at 28, to permit the plunger to slide past the centering strips 20 to force the potato in engagement with the knife blades 19.

A pitman 29 is pivotally connected to the cross head 26 and pivotally and eccentrically connected to a disc 30 secured on a power shaft 31 journaled on the supporting structure 5 by bearings 32. A grooved pulley 33 is secured to the shaft 31 to receive an endless power belt from a power source (not shown).

A flexible element 34 is connected to the cross head 26 and to the gate 22 for imparting thereto an upward movement during the extreme upward movement of the cross head for the purpose of opening the gate to allow a potato to gravitate from the chute 14 into the chamber 17.

The endless conveyor 13 is driven from the power shaft 31 through the employment of an endless sprocket chain and sprocket gears indicated generally by the character 35.

An upwardly inclined endless conveyor 36 has its lowermost end disposed under the knife construction 18 to receive the cut parts of potatoes and convey them upwardly to a discharge nozzle 36' mounted on the supporting structure adjacent the feed hopper 10. The endless conveyor 36 is suitably supported on the supporting structure 5 and is driven from the shaft 31 through the use of an endless sprocket chain and sprocket gears as indicated generally by the character 37.

The discharge nozzle 36' may be employed for directing the cut potatoes into sacks and if desired a regulator may be arranged therein for directing the cut potatoes first into one sack and then into the other.

In operation, a person stands at the end of the supporting structure 5 adjacent the control lever 12 and may keep the hopper 10 filled with potatoes and through the operation of the control lever deposit potatoes one at a time upon the endless conveyor 13 whence they are carried to the inclined chute 14 for gravitation into the cutting mechanism 16. As the plunger 24 nears its uppermost position, the gate 22 is elevated allowing a potato to gravitate into the chamber 17 and become centered over the knife blades 19 so that on the downward movement of the plunger 24 the potato will be forced past the knife blades and thereby become severed into a number of parts ready for planting. The cut potatoes gravitate onto the conveyor 36 and are carried thereby to the discharge nozzle 36' for sacking.

Thus it will be seen that a single person can control the feeding of potatoes into the device as well as to control the cut potatoes for sacking and later for planting thereby permitting a large number of potatoes to be cut to a selected number of parts within a comparatively short period of time.

It is to be understood that any number of knife blades may be included in the cutting arrangement 18 so that the number of parts that a potato will be cut into can be varied in accordance with the desire of the operator.

While I have shown and described the preferred embodiment of my invention, it will be understood that minor changes in construction, combination and arrangement of parts may be made without departing from the spirit and scope of the invention as claimed.

Having thus described the invention, what I claim is:

A seed potato cutting machine, comprising a supporting body frame, a hopper located on the upper part of said frame closely adjacent one end thereof, manually operable means at the same end of the frame for actuation by an operator stationed thereadjacent so as to control delivery of potatoes in succession and one at a time from the hopper, a potato receiver having a cutting chamber located on the supporting frame adjacent the opposite end thereof, a chute connected communicably to an intermediate part of said potato receiver and the upper part of the cutting chamber thereof, means for conveying potatoes as delivered from the hopper to said chute, cutting knives arranged in the lower portion of said cutting chamber and above a discharge outlet of the chamber, means for centering potatoes one at a time in said cutting chamber as received from the chute and above the knives, a reciprocatory plunger working in said cutting chamber, said plunger in its reciprocation traversing past the potato inlet of the chamber and at the end of its stroke in one direction pressing the centered potato thereunder against the underlying knives and thereby cutting the potato into sections, a gate operated intermittently by the plunger for controlling movement of the potatoes intermittently from the chute to the chamber while the plunger is in a position past the inlet from said chute on its stroke reverse from its potato pressing and cutting stroke, a discharge nozzle located on the upper part and end of said body frame at the side of and adjacent to said hopper so as to be within convenient reach of the operator stationed as first herein stated, means for conveying the cut pieces of potato as discharged from said cutting chamber to said discharge nozzle, and synchronized mechanical operating means for actuating said plunger in the cutting chamber together with its correlated gate actuated thereby and also for actuating the conveying means between said hopper and said potato receiver and the conveying means between the discharge outlet of the cutting chamber and said discharge nozzle.

LESTER A. HAWKINS.